(12) United States Patent
Ri et al.

(10) Patent No.: US 9,875,069 B2
(45) Date of Patent: Jan. 23, 2018

(54) INFORMATION PROCESSING APPARATUS, IMAGE PROCESSING APPARATUS, IMAGE FORMING APPARATUS AND STORAGE MEDIUM

(75) Inventors: Tetsuren Ri, Tokyo (JP); Toyoshige Nounishi, Tokyo (JP); Fumihito Akiyama, Tokyo (JP); Masahiro Ozawa, Tokyo (JP); Takahisa Matsunaga, Tokyo (JP); Hiroshi Nogawa, Tokyo (JP); Yasufumi Aoyama, Tokyo (JP); Kunikazu Satou, Tokyo (JP); Shunsuke Araki, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 63 days.

(21) Appl. No.: 13/452,266

(22) Filed: Apr. 20, 2012

(65) Prior Publication Data

US 2012/0268767 A1 Oct. 25, 2012

(30) Foreign Application Priority Data

Apr. 22, 2011 (JP) .................................. 2011-095786

(51) Int. Cl.
*G06F 3/12* (2006.01)

(52) U.S. Cl.
CPC ............ *G06F 3/1205* (2013.01); *G06F 3/125* (2013.01); *G06F 3/1285* (2013.01)

(58) Field of Classification Search
None
See application file for complete search history.

(56) References Cited

U.S. PATENT DOCUMENTS

| 2001/0056449 A1 | 12/2001 | Kawamoto et al. |
| 2006/0218004 A1* | 9/2006 | Dworkin .............. G06Q 10/101 705/300 |
| 2007/0070442 A1* | 3/2007 | Ohkubo ........................ 358/451 |
| 2011/0138268 A1* | 6/2011 | Zhang et al. ................. 715/239 |

FOREIGN PATENT DOCUMENTS

| JP | 2002-014797 | 1/2002 |
| JP | 2006-107216 A | 4/2006 |

OTHER PUBLICATIONS

"Printing out Multiple Slides with Notes", Mar. 2010, http://www.wa.gov/esd/training/quickguides/xp_pptwordprint.htm.*
Japanese Office Action corresponding to Japanese Application No. 2011-095786 dated May 21, 2013, Dispatch No. 318420.

* cited by examiner

*Primary Examiner* — Marivelisse Santiago Cordero
*Assistant Examiner* — Lennin Rodriguezgonzalez
(74) *Attorney, Agent, or Firm* — Osha Liang LLP

(57) ABSTRACT

An information processing apparatus includes a selection section. When the information processing apparatus makes an image forming apparatus perform image formation on a presentation file including first information on a first output image and second information on a second target output image associated with the first output image based on the first information and the second information, the selection section selects a target output image on which the image formation is performed from among the second output image.

13 Claims, 13 Drawing Sheets

FIG.4

```
┌─ PRINT RANGE ─────────────────────────────────────────────┐
│                                                            │
│  ○ ALL SLIDE      ○ CURRENT SLIDE                          │
│  ○ SPECIFIC SLIDE [                              ]         │
│  INPUT SLIDE NUMBER OR RANGE TO BE PRINTED WITH COMMA SEPARATION │
│                                                e.g. 1,3,5-12 │
│  ○ ALL NOTE WITH WRITING    ○ NOTE ONLY                    │
│  ○ SPECIFIC NOTE [                               ]         │
│  INPUT NOTE NUMBER OR RANGE TO BE PRINTED WITH COMMA SEPARATION │
│                                                e.g. 1,3,5-12 │
└────────────────────────────────────────────────────────────┘
```

FIG.8

¥ppt¥notesSlides¥notesSlide3.xml

```
<p:sp>
 :
 <p:txBody>                                                          a
 :
  <a:p>
   <a:r>
    <a:rPr kumimoji="1" lang="ja-JP" altLang="en-US" dirty="0" smtClean="0" />
    <a:t>中国故宮 </a:t>
   </a:r>
   <a:r>
    <a:rPr kumimoji="1" lang="ja-JP" altLang="en-US" dirty="0" smtClean="0" />
    <a:t> モノクロ画像</a:t>
   </a:r>
   <a:endParaRPr kumimoji="1" lang="ja-JP" altLang="en-US" dirty="0" smtClean="0"
/>
  </a:p>
 </p:txBody>
</p:sp>
<p:sp>
 <p:nvSpPr>
  <p:cNvPrid="4" name="スライド番号プレースホルダ 3" />
  <p:cNvSpPr>
   <a:spLocks noGrp="1" />
  </p:cNvSpPr>
  <p:nvPr>
   <p:ph type="sldNum" sz="quarter" idx="10" />
  </p:nvPr>
 </p:nvSpPr>
 <p:spPr />
 <p:txBody>
  <a:bodyPr />
  <a:lstStyle />
  <a:p>
   <a:fld id="{111A2222-33BB-44CC-55DD-66EE7777F8}" type="slidenum">
    <a:rPr kumimoji="1" lang="ja-JP" altLang="en-US" smtClean="0" />
    <a:pPr/>                          b
    <a:t>3</a:t>
   </a:fld>
   <a:endParaRPr kumimoji="1" lang="ja-JP" altLang="en-US" dirty="0" smtClean="0"
/>
  </a:p>
 </p:txBody>
</p:sp>
```

FIG.9

¥ppt¥notesSlides¥notesSlide3.xml      c

```
<a:p>
 <a:r>
  <a:rPr kumimoji="1" lang="ja-JP" altLang="en-US" sz="1600" dirty="0" smtClean="0">
   <a:solidFill>
    <a:srgbClr val="FF0000" />
   </a:solidFill>
  </a:rPr>
  <a:t>頤和園</a:t>
 </a:r>
 <a:r>
  <a:rPr kumimoji="1" lang="ja-JP" altLang="en-US" dirty="0" smtClean="0" />
  <a:t>の一角</a:t>
 </a:r>
 <a:endParaRPr kumimoji="1" lang="ja-JP" altLang="en-US" dirty="0" />
</a:p>
```

INFORMATION PROCESSING APPARATUS, IMAGE PROCESSING APPARATUS, IMAGE FORMING APPARATUS AND STORAGE MEDIUM

BACKGROUND OF THE INVENTION

Field of the Invention

The present invention relates to an information processing apparatus, an image processing apparatus, an image forming apparatus and a storage medium.

Description of the Related Art

Conventionally, there are known various kinds of application software (presentation software, hereinbelow) for presentations with slides. In addition to displaying slides, the presentation software can create a note for each slide so as to add a memo or a comment to the slide.

Furthermore, in recent years, output formats of the presentation software have been standardized. The OOXML (Office Open XML) format used as an output file format in Power Point® is one of the file formats having their specifications standardized. By standardizing the specifications of output file formats, it becomes easy to develop new software having data compatibility.

When printing out created slides, the presentation software is capable of not only printing out each of the slides as it is (print mode; slide mode), but also printing out the slides as a handout by disposing a plurality of slides on each sheet and outlining each of the slides (print mode; handout mode). The presentation software is also capable of printing out the slides and contents written in note parts in such a way as to be disposed next to each other (print mode; note-format mode).

These print modes can be set with a print mode setting screen or the like when the presentation software is executed. It is often desired to output the slides both in the slide mode and in the handout mode for a presentation. However, it is troublesome to switch the settings of the print modes, and output the slides as they are and as handouts separately. Hence, for example, Japanese Patent Application Laid-Open Publication No. 2002-14797 (corresponding to U.S. Patent Application Publication No. 2001/0056449) discloses a technology by which slides are printed out as they are and as handouts successively with one setting.

Conventionally, when the presentation software outputs data in the note-format mode, an output area for a slide and an output area for a note part corresponding to the slide are provided in each page without exception. However, data is not always inputted in all the note parts for the slides. In addition, among memos and/or documents in the note parts, there may be contents which a user does not want to output. In such a case, if the setting is changed for a note part necessary to be outputted and for a note part unnecessary to be outputted so that a slide with a note part and a slide without a note part are separately outputted, its processing becomes complicated. In addition, it is waste of paper to provide an output area for a note part which includes no writing, and print out the note part.

SUMMARY OF THE INVENTION

Objects of the present invention are to provide an information processing apparatus, an image processing apparatus, an image forming apparatus and a storage medium which increase user's convenience in image formation of presentation data, and perform the image formation efficiently.

In order to achieve at least one object described above, according to an aspect of the present invention, there is provided an information processing apparatus including: a selection section which, when the information processing apparatus makes an image forming apparatus perform image formation on a presentation file including first information on a first output image and second information on a second output image associated with the first output image based on the first information and the second information, selects a target output image on which the image formation is performed from among the second output image.

Preferably, in the information processing apparatus, the second output image includes a blank image, and when the second output image is the blank image, the selection section does not select the second output image as the target output image.

Preferably, in the information processing apparatus, the selection section selects the target output image based on print setting information on selection of the target output image.

Preferably, in the information processing apparatus, the selection section selects the target output image from among the first output image and the second output image.

Preferably, in the information processing apparatus, the selection section is capable of selecting the target output image only from among the second output image.

Preferably, in the information processing apparatus, the presentation file is in an OOXML format.

Preferably, in the information processing apparatus, the first information is slide information, and the second information is note input information, and the selection section decides whether or not to select the second output image as the target output image on a slide basis.

Preferably, in the information processing apparatus, the first information is slide information, and the second information is theme information, character information or media information included in the slide information, and the selection section decides whether or not to select the second output image as the target output image on a slide basis.

Preferably, the information processing apparatus further includes: a setting section which sets an output image number of the first output image and the second output image formed on one sheet, and sets disposition of the first output image and/or the second output image of the set output image number on the sheet.

BRIEF DESCRIPTION OF THE DRAWING

The present invention will be fully understood by the following detailed description and the accompanying drawings, which are not intended to limit the present invention, wherein:

FIG. 4 shows a print range setting screen displayed on a display section with a print control program;

FIG. 8 shows data recorded in a notesSlide3.xml file;

FIG. 9 shows other data recorded in the notesSlide3.xml file;

DETAILED DESCRIPTION OF THE PREFERRED EMBODIMENT

In the following, an embodiment of the present invention is described in detail with reference to the accompanying drawings.

Figure 1:
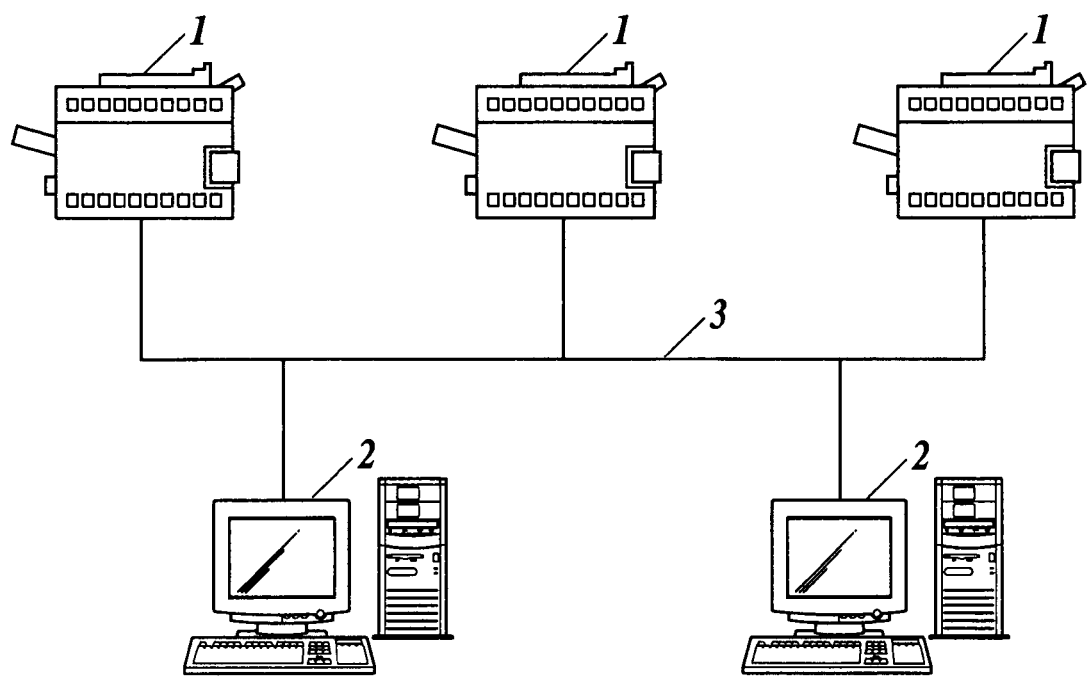
FIG. 1 is a block diagram of a network system including an information processing apparatus in accordance with an embodiment of the present invention.

FIG. 1 is a block diagram of a network system including an information processing apparatus, an image processing apparatus and/or an image forming apparatus in accordance with the embodiment of the present invention.

In this network system, three image forming apparatuses 1 are connected to two computers 2 via a line 3 so as to communicate therewith.

The line 3 forms a network constituted of the image forming apparatuses 1 and the computers 2. As long as the line 3 can connect the computers 2 and the image forming apparatuses 1 with each other so as to be communicable, the type thereof is not limited. For example, the line 3 may be a line for wire connection such as a LAN (Local Area Network) cable, a coaxial cable or an optical fiber, may be a line using a wireless communication standard such as Bluetooth® or a wireless LAN, or may be a combination thereof. The scale of the network formed by the line 3 is not limited, and hence may be a LAN or the Internet, for example.

Figure 2:
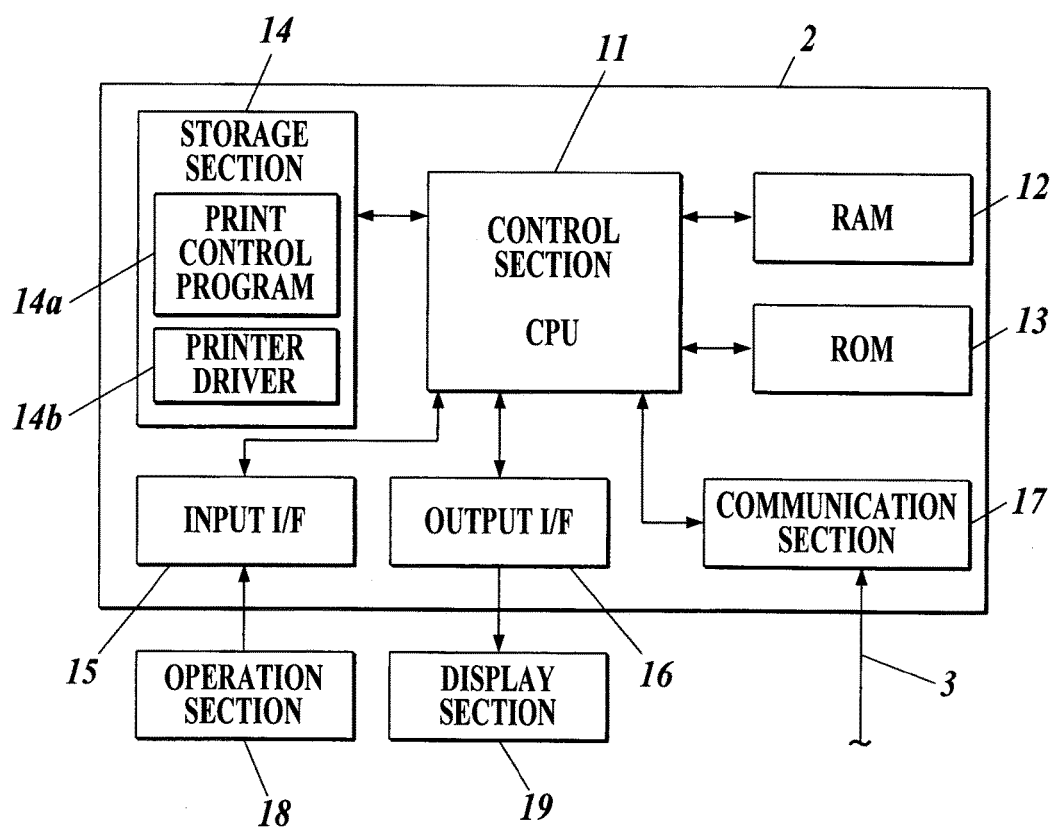
FIG. 2 is a block diagram showing a configuration of a computer.

FIG. 2 is a block diagram showing a configuration of the computer 2.

The computer 2 is, for example, a PC (Personal Computer), a PDA (Personal Digital Assistant), a mobile phone or a smart phone, to be specific.

The computer 2 includes a control section 11, a RAM (Random Access Memory) 12, a ROM (Read Only Memory) 13, a storage section 14, an input I/F (InterFace) 15, an output I/F and a communication section 17. An operation section 18 is connected to the input I/F, and a display section 19 is connected to the output I/F.

The control section 11 includes a CPU (Central Processing Unit). The control section 11 loads various programs and data stored in the ROM 13 or the storage section 14 to the RAM 12 so as to perform various kinds of arithmetic processing. In addition, the control section 11 controls operations of the computer 2 based on the programs overall.

The programs executed by the control section 11, data and the like are loaded into the RAM 12, and temporarily stored therein. The RAM 12 is also used as a work memory space to store temporal data and the like processed by the programs. A control program such as a BIOS (Basic Input/Output System) executed by the control section 11 and data necessary therefor are stored in the ROM 13 in a readable form. The ROM 13 may be a nonvolatile memory such as a flash memory or an EEPROM (Electrically Erasable and Programmable Read Only Memory).

Various kinds of software (programs) and application data are stored in the storage section 14 in a readable and usable form. In the embodiment, the storage section 14 is a hard disk, but not limited thereto. The storage section 14 may be a SSD (Solid State Disk), for example. The software stored in the storage section 14 includes a print control program 14a and a printer driver 14b compatible with the image forming apparatus 1. The print control program 14a is a program to carry out various settings for image formation based on a Power Point file in the OOXML format. The printer driver 14b is software to create data in a predetermined data format for printing (PDL; Page Description Language) based on set information, and transmit the data to the image forming apparatus 1. In addition to these, for example, presentation software is stored in the storage section 14 so that the Power Point file in the OOXML format can be stored therein.

The input I/F 15 is an interface to connect the control section 11 to an external device so as to control input signals from the external device. In the embodiment, with the input I/F 15, the control section 11 and the operation section 18 as an external device are connected. The operation section 18 is, for example, a keyboard and/or a mouse. The output I/F 16 is an interface to connect the control section 11 to an external device so as to control output signals from the control section 11 and convert the signals, to output the signals to the external device. In the embodiment, with the output I/F 16, the control section 11 and the display section 19 as an external device are connected. The display section 19 is, for example, a display such as an LCD (Liquid Crystal Display) or an organic ELD (Electro-Luminescent Display).

The input I/F 15 and the output I/F 16 may be connected to a device which performs both an input operation and a display operation, such as a touch panel. The operation section 18 and the display section 19 may be external devices connected with the control section 11 via a cable or the like, or may be disposed on the outer surface of the computer 2 to be united with the computer 2.

The communication section 17 controls communications to connect the computer 2 to an outside network via the line 3. The communication section 17 is, for example, an NIC (Network Interface Card).

Figure 3:
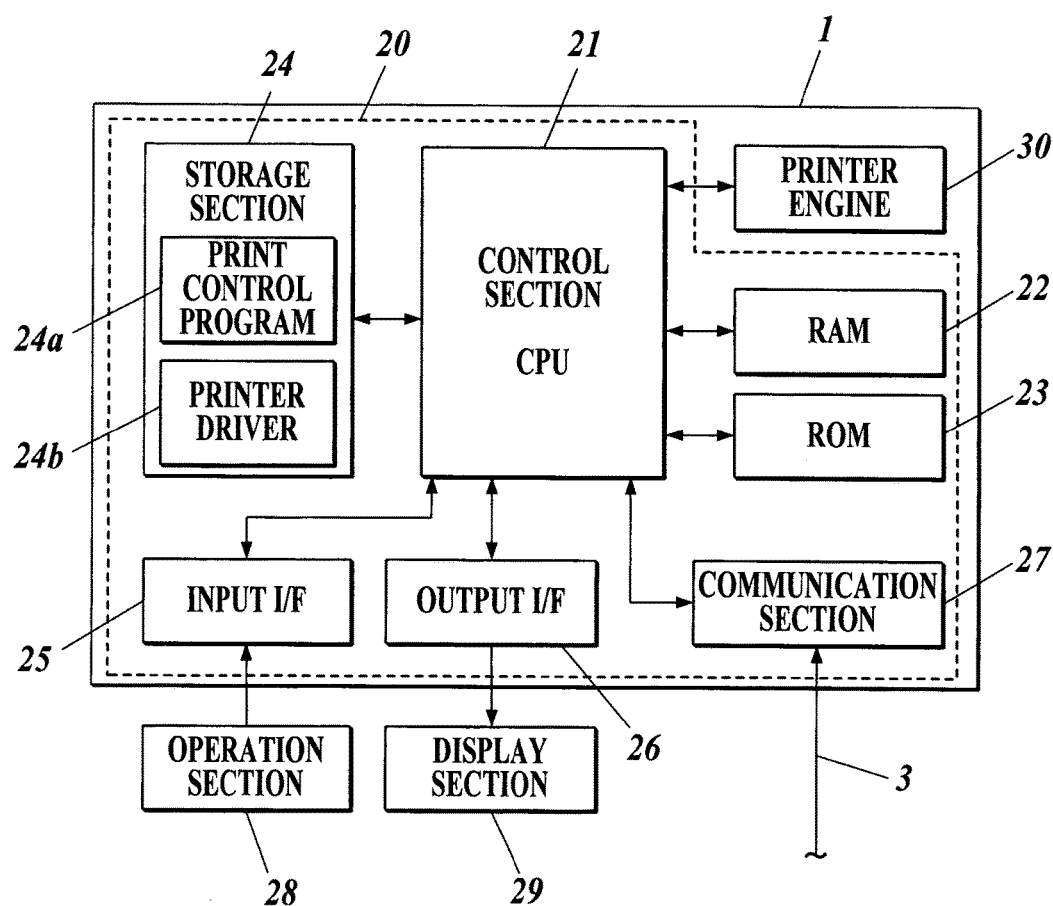
FIG. 3 is a block diagram showing an internal configuration of an image forming apparatus.

FIG. 3 is a block diagram showing an internal configuration of the image forming apparatus 1.

The image forming apparatus 1 includes an information processing section 20 as an information processing apparatus and as an image processing apparatus, and a printer engine 30.

The information processing section 20 includes a control section 21 (a selection section, a setting section, a print data creation section), a RAM 22, a ROM 23, a storage section 24, an input I/F 25, an output I/F 26 and a communication section 27.

The control section 21 includes a CPU. The control section 21 loads various programs and data stored in the ROM 23 or the storage section 24 to the RAM 22 so as to perform various kinds of arithmetic processing. In addition, the control section 21 controls operations of the image forming apparatus 1 based on the programs overall.

The control section 21 may have a CPU to perform arithmetic processing and a CPU to perform control processing separately.

The programs executed by the control section 21, data and the like are loaded into the RAM 22, and temporarily stored therein. The RAM 22 is also used as a work memory space to store temporal data and the like processed by the programs. A control program such as a BIOS executed by the control section 21 and data necessary therefor are stored in the ROM 23 in a readable form.

Various kinds of software (programs), application data, and print setting information and a presentation file as a print target transmitted from the computer 2 are stored in the storage section 24 in a readable and usable form. In the embodiment, the storage section 24 is a hard disk, but not limited thereto. The storage section 24 may be a SSD (Solid State Disk), for example. The software stored in the storage section 24 includes a print control program 24a and a printer driver 24b suitable for analyzing print data in the image forming apparatus 1. The print control program 24a is a program to carry out various settings for image formation based on a Power Point file in the OOXML format. The printer driver 24b is software to create data in a predetermined data format for printing (PDL; Page Description Language) based on set information, and convert the data into raster image data transmitted to the printer engine 30. In addition to these, a conversion program to analyze print data in PDL obtained from outside by the communication section 27, and convert the data into intermediate data, and an output program to convert the intermediate data into raster image data for printing (print image data), and output the data to the printer engine 30 are stored in the storage section 24.

By storing these programs in the ROM 23 in advance, and installing the ROM 23 in the image forming apparatus 1, the image forming apparatus 1 can be configured without the storage section 24. Alternatively, the image forming apparatus 1 may store the print setting information and the presentation file not in the storage section 24 but in the RAM 22, and perform processing using those.

The input I/F 25 is an interface to connect the control section 21 to an external device so as to control input signals. In the embodiment, with the input I/F 25, the control section and the operation section 28 (operation section) are connected. The output I/F 26 is an interface to connect the control section 21 to an external device so as to control output signals from the control section 21 and convert the signals, to output the signals to the external device. In the embodiment, with the output I/F 26, the control section 21 and the display section 29 are connected. The operation section 28 and the display section 29 are, for example, a touch panel using an LCD. Alternatively, the operation section 28 and the display section 29 may be separate components. For example, the operation section 28 is a keyboard and/or a mouse, and the display section 29 is an LCD or an organic ELD. Alternatively, the operation section 28 and the operation section 29 may be included in the image forming apparatus 1. The operation section 28 receives operations from a user, generates input signals corresponding to the operations, and outputs the generated input signals to the control section 21. The display section 29 displays various setting screens, operation states, processing results and the like in accordance with display signals outputted form the control section 21.

The communication section 27 controls communications to connect the image forming apparatus 1 to an outside network via the line 3. The communication section 27 is, for example, an NIC (Network Interface Card).

The printer engine 30 as an image forming section performs image formation processing (print processing) based on the raster image data for printing (print image data) transmitted from the information processing section 20. Although not being particularly limited, a printing method applicable to the printer engine 30 is, for example, electrophotography, inkjet, thermal transfer, or offset.

Next, a print setting is described. The print setting is settable to print data which is created in order to print a Power Point file in the OOXML format. The print setting is obtained with the print control program 14a or the print control program 24a being executed. The print control program 14a or 24a starts, for example, when a user drags and drops an icon of the Power Point file to be printed on an icon of the print control program 14a or 24a, or selects a file name of the Power Point file on the touch panel. The print control program 14a or 24a is executed independently of the presentation software by which the Power Point file is created. When the print control program 14a or 24a starts, the printer driver 14b or 24b also starts. Then, the necessary print setting information is deliverable between the print control program 14a or 24a and the printer driver 14b or 24b. In the following, a case is described, the case in which the image forming apparatus 1 creates the print setting and the print data, using the print control program 24a.

Figure 5:
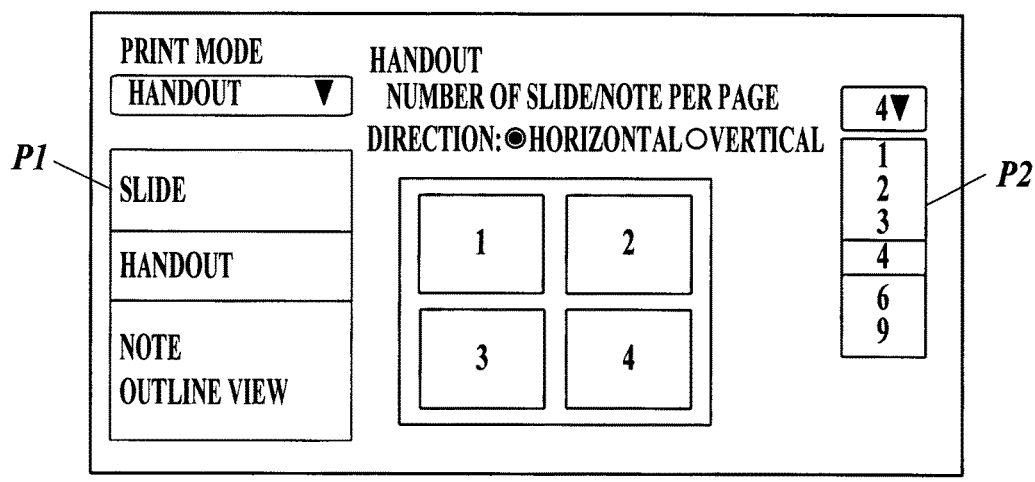
FIG. 5 shows a print mode setting screen displayed on the display section.

FIG. 4 shows a print range setting screen displayed on a display section with a print control program. FIG. 5 shows a print mode setting screen displayed on the display section.

As shown in FIGS. 4 and 5, when the print control program 24a is executed, the print range setting screen and the print mode setting screen are displayed on the display section 29. By operating the operation section 28 so as to put inputs on the setting screens, a user can set desired print settings.

On the print range setting screen, a slide number of a slide (first output image) and a note number of a note part (second output image) which a user desires to print are independently selected. Then, a search for a note number of a note part having writing information is automatically performed, and a note part which is judged by the search as a note part having writing information is selected as a target output image, and included in print data.

On the print mode setting screen, by using a pull-down menu P1, a print mode in which a user desires to perform printing is selected from among a slide mode, a handout mode, a note-format mode and an outline-view mode. In the embodiment, even when the slide mode or the handout mode is selected on the print mode setting screen, a note part selected on the print range setting screen is outputted. In the handout mode, by using a pull-down menu P2, the number of slides and/or note parts (output image number) which a user desires to dispose on one sheet (page) is selected. The output image number may be changeable, regardless of the print modes.

The print range setting screen and the print mode setting screen may be displayed on a same screen or may be switched so that one of the screens is displayed as needed. The disposition of the screens, operation methods of the screens, and the order of operations of the screens can be optionally set.

Figure 6A:
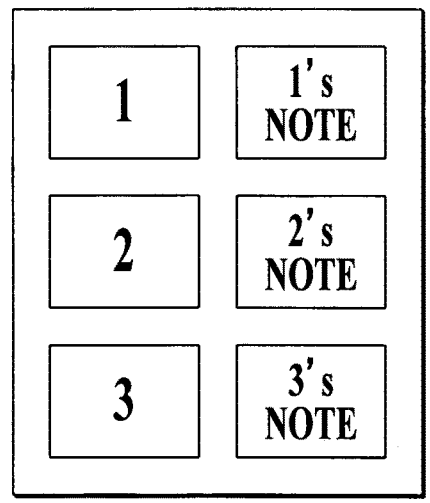
FIGS. 6A to 6C are examples of print patterns in different print modes.
Figure 6B:
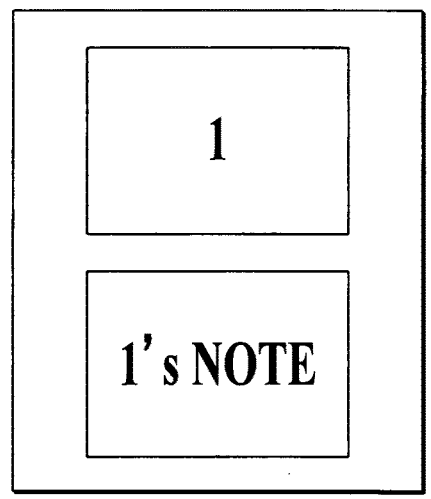
Figure 6C:
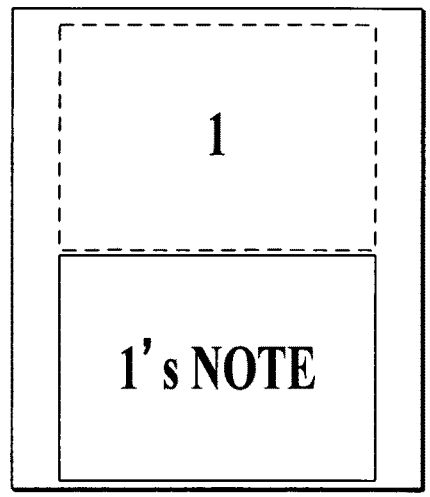

FIGS. 6A to 6C show output examples of output image patterns each of which is obtained in a selected print mode.

FIG. 6A shows an example of an output image pattern obtained when the handout mode is selected as the print mode, and six slides/note parts are outputted on one sheet (page). In this example, both slides and note parts are included in the print range. Three slides and three note parts are disposed on one sheet so as to be outputted.

FIG. 6B is an example of an output image pattern obtained when the note-format mode is selected as the print mode, and one slide and one note part which is for the slide are disposed on one sheet in the vertical direction. The output image pattern of this example is the same as that obtained in a conventional note-format mode.

FIG. 6C is an example of an output image pattern obtained when the slide mode is selected as the print mode, and two slides/note parts are outputted on one sheet. In this example, both slides and note parts are included in the print range. One slide with no outline and one note part which is for the slide are disposed on one sheet so as to be outputted. The disposition is the same as that by layout printing.

Next, a method for search and retrieval of a slide, the note part for which has writing, namely, the note part in which a note is written, when printing is performed based on a Power Point file in the OOXML format is described.

Figure 7:
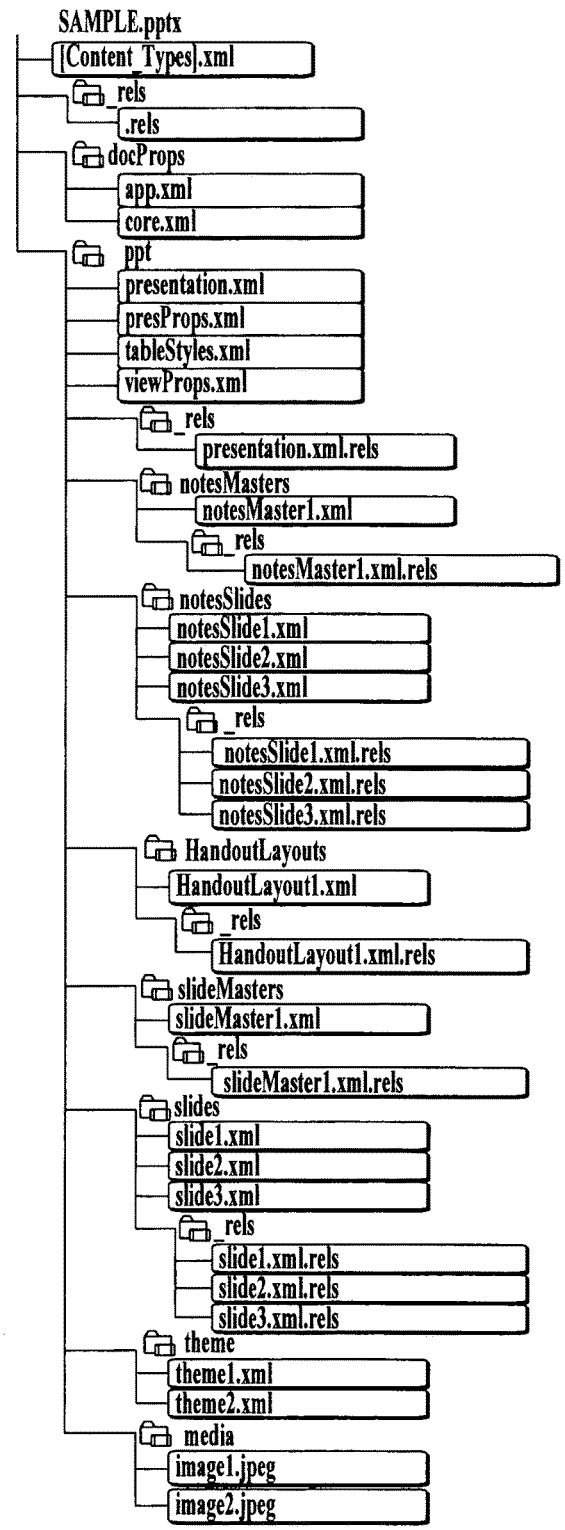
FIG. 7 shows a file configuration of a Power Point file in the OOXML format.

FIG. 7 shows a file configuration of a Power Point file in the OOXML format.

The Power Point file in the OOXML format (extension; .pptx) is an archive file in which a plurality of XML files (extension; .xml), related files (extension; .rels) and, when necessary, image files (extension; .jpeg in the embodiment) are compressed and stored in the ZIP format. For example, a Power Point file (SAMPLE.pptx in the embodiment) is constituted of [Content_Types].xml and files included in a _ rels folder, a docProps folder and a ppt folder.

The ppt folder has a plurality of subfolders. Of the subfolders, a slides folder includes a slideY.xml file (first information, a slide file), and a notesSlides folder includes a notesSlideX.xml file (second information, a note file). The slideY.xml file is data of a slide having the slide number "Y". The notesSlideX.xml file is data of a note part having the note number "X". (Each of "X" and "Y" is a positive integer set in order starting from "1", in general.) In the SAMPLE.pptx file shown in FIG. 7, data of slides and note parts for three pages are independently stored in files, and combined in an archive file. When there is no data file of a note part (note file) for a slide file, and image formation in the note-format mode is performed, the note part is outputted as a blank image.

Figure 10:
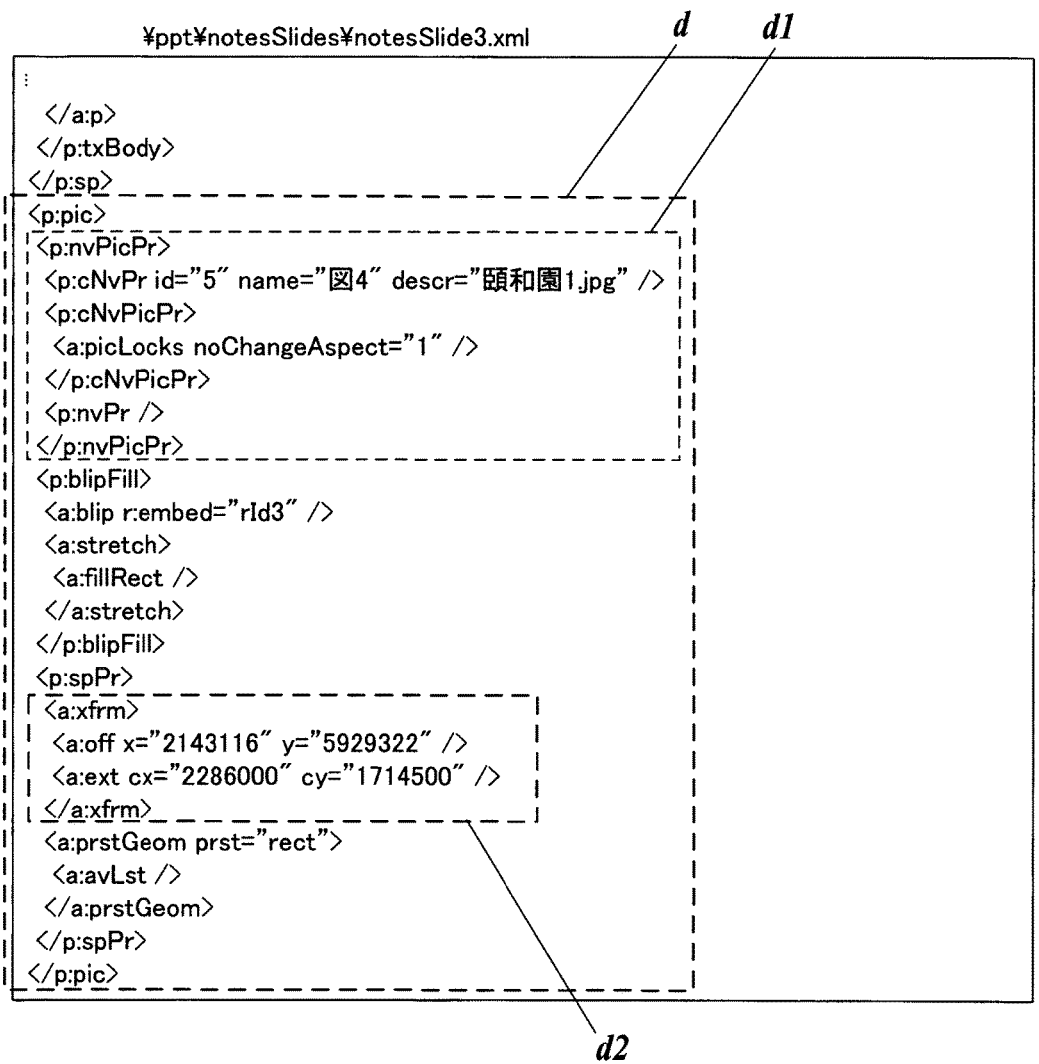
FIG. 10 shows other data recorded in the notesSlide3.xml file.

FIGS. 8 to 10 show examples of parts of the content recorded in a notesSlide3.xml file.

FIG. 8 shows a part in which characters are written of the note part for the third page. The characters sandwiched by text character tags <a:t> and </a:t> in an area enclosed by the start paragraph tag <a:p> and the end paragraph tag </a:p> (shown by a broken line a) indicate a matter written in the note part. In the note part for the third page, characters of "中国故宫 (Imperial Palace in China)" and characters of "モノクロ画像 (monochrome image)" are written. A notesSlideX.xml file could be created even when there is no writing in a note part at all. In this case, if being outputted, the image of the note part is a blank image. Therefore, in the embodiment, whether or not there is input character data in a note part is checked by obtaining the content of the file and examining whether or not a character string exists therein as described above.

Similarly, in FIG. 8, there is a part sandwiched by the text character tags <a:t> and </a:t> in an area enclosed by the start paragraph tag <a:p> and the end paragraph tag </a:p> (shown by a broken line b). However, the text character "3" in the part is between field tags <a:fld> and </a:fld>, and hence indicates a page number of a slide (slide number) corresponding to the note part. Therefore, when whether or not there is writing in a note part is judged in the embodiment, that part is excluded from the judgment. That part is used for checking a correspondence of a note part to a slide number.

FIG. 9 shows a part in which characters are written of another paragraph in the notesSlide3.xml.

When there is a plurality of paragraphs in one note part, a plurality of combinations of the paragraph tags <a:p> and </a:p> is described in a file indicating the content of the note part. Inside each combination of the paragraph tags <a:p> and </a:p>, the content of the note part is expressed by using the text character tags <a:t> and </a:t>. In the embodiment, in one of the combinations, characters "頤和園" (Summer Palace in China) are expressed.

At the time, in the content (shown by a broken line c in FIG. 9) described before the character string <a:p> 頤和園 </a:p>, the sz="1600" included in a run propaty tags <a:rPr> indicates a font size of the character string, and the val="FF0000" included in an RGB color set tag <a:srgbClr> indicates a font color (red in the embodiment) thereof in RGB hexadecimal notation. When the print data of the Power Point file is created, the control section 21 reads these pieces of information to create the print data of the note part.

FIG. 10 shows an example described between picture tags <p:pic> and </p:pic> in the notesSlide3.xml.

In a note part, not only characters but also image (picture) files can be displayed. When an image file is included in a note part, independent of combinations of shape tags <p:sp> and </p:sp> including the above-described paragraph tags <a:p> and </a:p>, another combination of the shape tags <p:sp> and </p:sp> including picture tags <p:pic> and </p:pic> are used to set image display. The image file is indicated by an ID specified in non-visual property tags <p:cNvPr> and </p:cNvPr> shown by a broken line d1. Therefore, in the note content search/retrieval in the embodiment, in addition to the character string search/retrieval described above, image search/retrieval in the picture tags is performed, whereby whether or not there is writing in the note part is judged.

When a figure is included in a note part, the coordinates to dispose the figure is indicated in two-dimensional coordinate transformation tags <a:xfrm> and <a:xfrm> shown by a broken line d2. When image formation of the Power Point file is performed, the control section 21 reads these pieces of information to create the print data of the note part.

Next, steps of print data creation processing performed by the control section 21 when image formation is performed based on a Power Point file are described.

Figure 11:
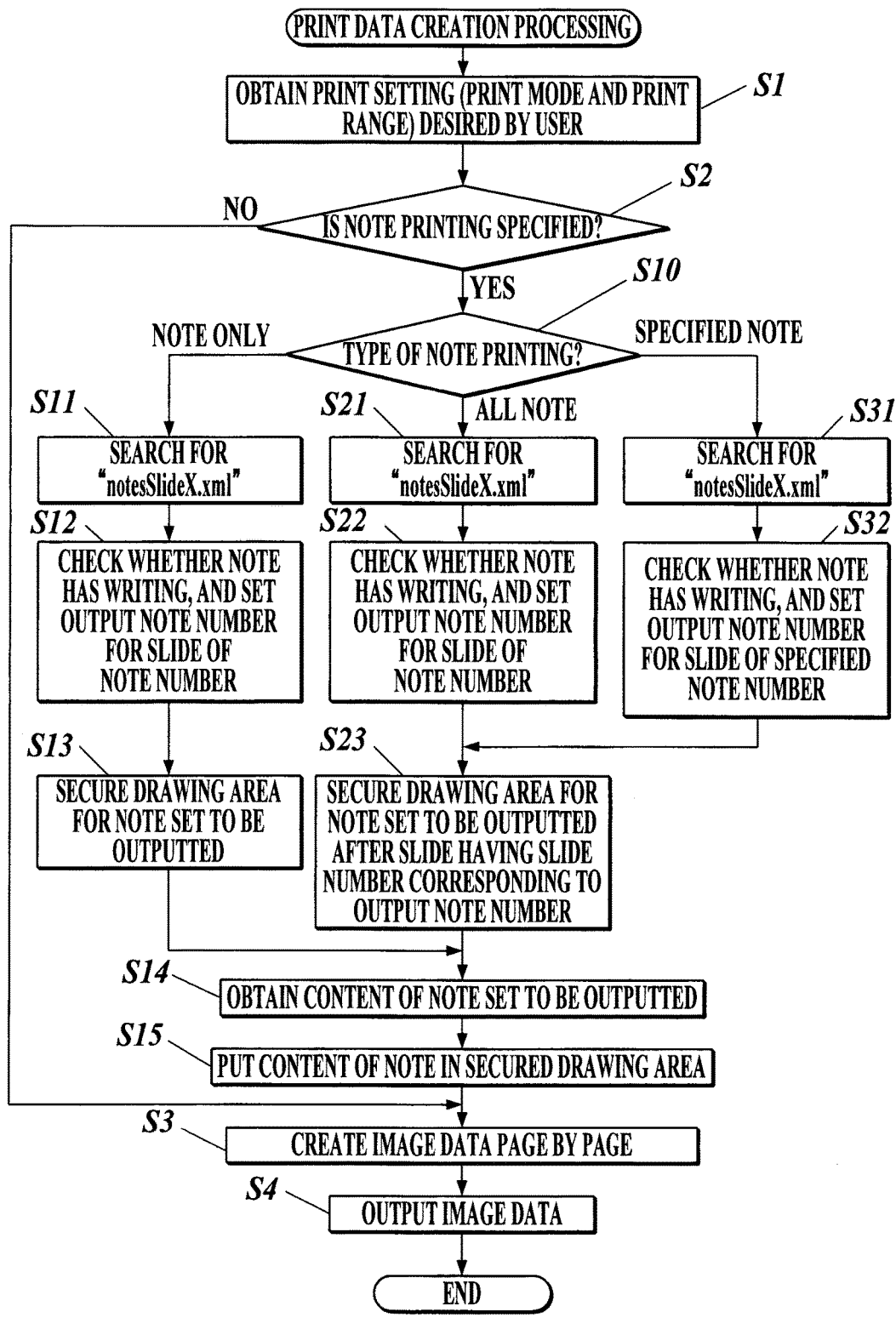
FIG. 11 is a flowchart showing control steps of processing to create data for image formation (print data creation processing) performed by a control section.

FIG. 11 is a flowchart showing control steps of the print data creation processing performed by the control section 21.

The print data creation processing is performed by executing the print control program 24a, and also calling and executing the printer driver 24b.

When the print data creation processing starts, the control section 21 first obtains print setting data desired by a user based on an input signal from the operation section 28 (Step S1). The print setting data indicates settings of a name of a presentation file as a print target, note printing/outputting, the type of the note printing, a print mode and a range of pages to be printed (print range), for example. When the print setting is already performed, the control section 21 obtains, for example, print setting data correlated with the presentation file selected as a print target.

Next, the control section 21 judges whether or not the note printing is specified based on the obtained print setting data (Step S2). When judging that the note printing is not specified (Step S2; NO), the control section 21 moves to Step S3. When judging that the note printing is specified (Step S2; YES), the CPU 21 judges the type of the note printing (Step S10).

When judging that the type of the note printing is to print only note data, the control section 21 first searches a ¥ppt¥notesSlides folder for notesSlideX.xml files (Step S11). Next, the control section 21 checks the contents of existing notesSlideX.xml files to judge whether or not there is writing in note parts. Then, the control section 21 obtains slide numbers corresponding to notesSlideX.xml files judged to have writing in note parts, and sets, as target output images, only note parts of the note file numbers (output note numbers) corresponding to the slide numbers equal to the note numbers, namely, only note parts for slides of slide numbers equal to the note numbers (Step S12). The control section 21 secures a drawing area for each of the note parts selected as the target output images (Step S13). Then, the control section 21 moves to Step S14.

When judging that the type of the note printing is to print slide data and all note data with writing at Step S10, the control section 21 first searches the ¥ppt¥notesSlides folder for notesSlideX.xml files (Step S21). Next, the control section 21 checks the contents of existing notesSlideX.xml files to judge whether or not there is writing in note parts. Then, the control section 21 obtains slide numbers corresponding to notesSlideX.xml files judged to have writing in note parts, and sets, as target output images, only note parts of the note file numbers (output note number) corresponding to the slide numbers equal to the note numbers, namely, only note parts for slides of slide numbers equal to the note numbers (Step S22). The control section 21 secures a drawing area for each of the note parts selected as the target output images after data of their respective slides having slide numbers corresponding to the note parts (Step S23). Then, the control section 21 moves to Step S14.

When judging that the type of the note printing is to print slide data and note data having specified note numbers at Step S10, the control section 21 first searches the ¥ppt¥notesSlides folder for notesSlideX.xml files (Step S31). Next, the control section 21 checks the contents of existing notesSlideX.xml files to judge whether or not there is writing in note parts. Then, the control section 21 obtains slide numbers corresponding to notesSlideX.xml files judged to have writing in note parts, and sets, as target output images, only note parts of note file numbers (output note numbers) corresponding to slide numbers equal to the note numbers specified at Step S10 among the obtained slide numbers, namely, only note parts for slides of slide numbers equal to the note numbers specified at Step S10 among the obtained slide numbers (Step S32). Then, the control section 21 moves to Step S23.

When moving to Step S14 from Step S13 or S23, the control section 21 obtains data indicating the contents of the note parts, which are set to be outputted, from their respective notesSlideX.xml files (Step S14). The control section 21 puts the obtained note data in their respective drawing areas secured at Step S13 or S23 (Step S15). When print data sorted in a print order (output order) is created, the control section 21 moves to Step S3.

When the control section 21 moves to Step S3 from Step S2 or S15, the control section 21 creates image data based on the set print data, sheet by sheet (page by page) (Step S3). When a plurality of images is displayed on one sheet, and the last image data for the sheet is slide data, the control section 21 judges whether or not the next print target data of the print data is note data for the slide data, before creating image data of the slide data. When judging that the next print target data is note data for the slide data, the control section 21 inserts a command on a page break before creating image data of the slide data, so as not to divide the slide data and the corresponding note data, and accordingly not to form images thereof on different sheets.

When image data for one sheet is created, the control section 21 outputs the image data to the printer engine 30 (Step S4). The printer engine 30 performs image formation based on the outputted image data.

Next, examples of output image patterns formable by the image forming apparatus 1 in the embodiment are shown.

FIGS. 12A to 12C and FIGS. 13A to 13C show output image patterns formable by the image forming apparatus 1 in the embodiment. Each of the examples shown in FIGS. 12A to 12C and FIGS. 13A to 13C is an example of an output image pattern formed when the handout mode is set such that four slides/note parts are disposed on one sheet (page) of a handout on the print mode setting screen shown in FIG. 5.

Figure 12A:
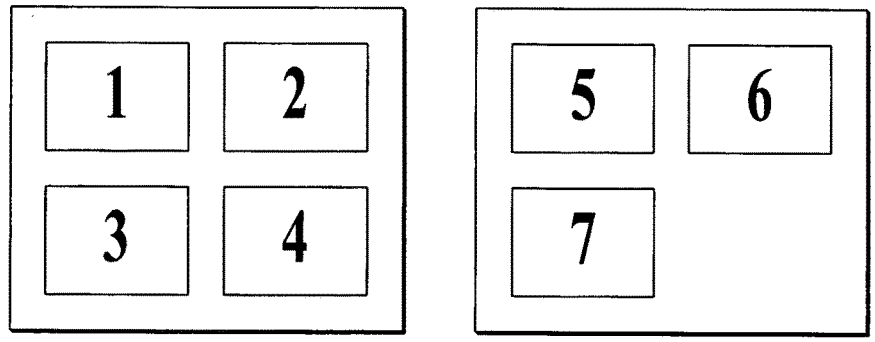
FIGS. 12A to 12C show print patterns available with the information processing apparatus in the embodiment.

FIG. 12A shows an example of an output image pattern of output images formed when seven slides are outputted in order as before. These output images can be formed by not setting any note numbers but setting slide numbers by selecting the "All Slide" on the print range setting screen shown in FIG. 4.

Figure 12B:
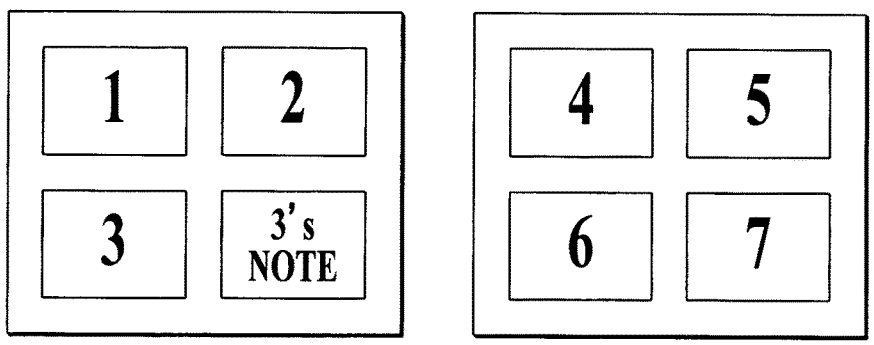

FIG. 12B shows an example of an output image pattern of output images formed when, in addition to first to seventh slides, a third note (note part) for the third slide is outputted. An image of the third note is outputted next to (after) the third slide, so as to correspond to the slide number. These images can be formed by setting slide numbers by selecting the "All Slide" and setting note numbers by selecting the "Specific Note" and inputting "3" in an input area to specify note parts on the print range setting screen shown in FIG. 4.

Figure 12C:
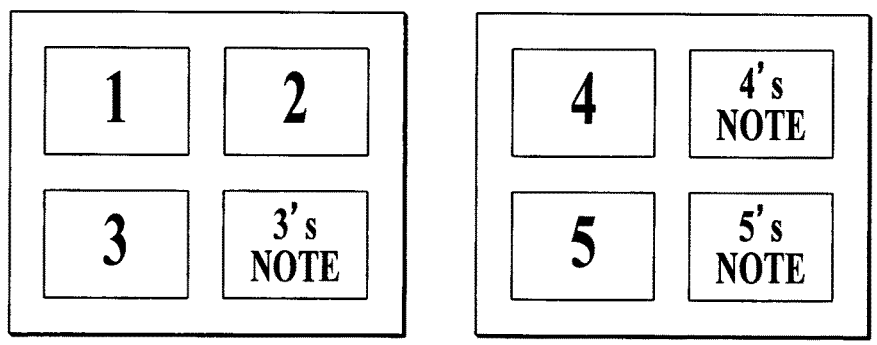

FIG. 12C shows an example of an output image pattern of output images for first two pages obtained when the "All Slide" and the "All Note with Writing" are selected on the print range setting screen shown in FIG. 4. When the "All Note with Writing" is selected, search and retrieval of note parts having written contents are performed, and the retrieved note parts having writing are selected with slides as target output images. In this example, the first and second notes do not have written contents, and the third to fifth notes have written contents, and the third to fifth notes are disposed to be respectively displayed next to (after) the third to fifth slides, and outputted.

Figure 13A:
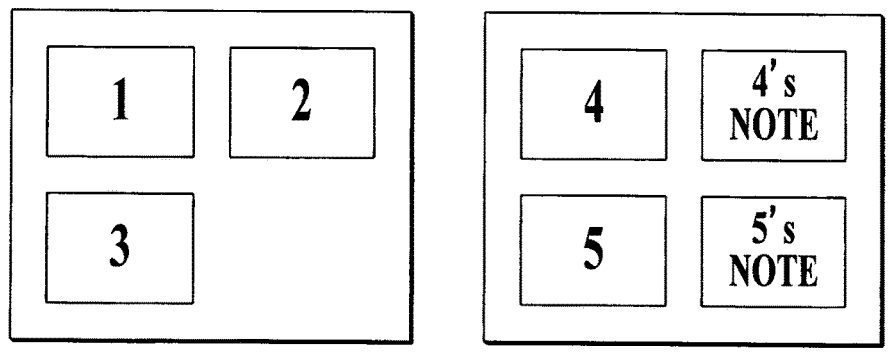
FIGS. 13A to 13C show print patterns available with the information processing apparatus in the embodiment.

FIG. 13A shows another example of an output image pattern of output images for first two pages obtained when the "All Slide" and the "All Note with Writing" are selected on the print range setting screen shown in FIG. 4. In this example, the first to third notes do not have written contents, and the fourth and fifth notes have written contents, and the fourth and fifth notes are disposed to be respectively displayed next to (after) the fourth and fifth slides, and outputted. In this case, if all the first to fifth slides and the fourth and fifth notes are disposed in order as before, the third and fourth slides are disposed at the lower part of the first page, and the fourth note and the fifth slide are disposed at the upper part of the second page, which is not eye-friendly because the fourth slide and the fourth note for the fourth slide are separated, namely, disposed on different pages. Hence, after the third slide, space is inserted, so that the fourth slide and the fourth note are disposed next to each other.

Figure 13B:
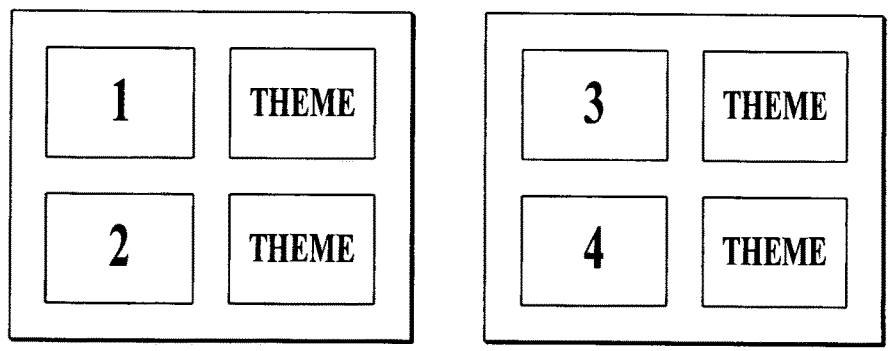
Figure 13C:
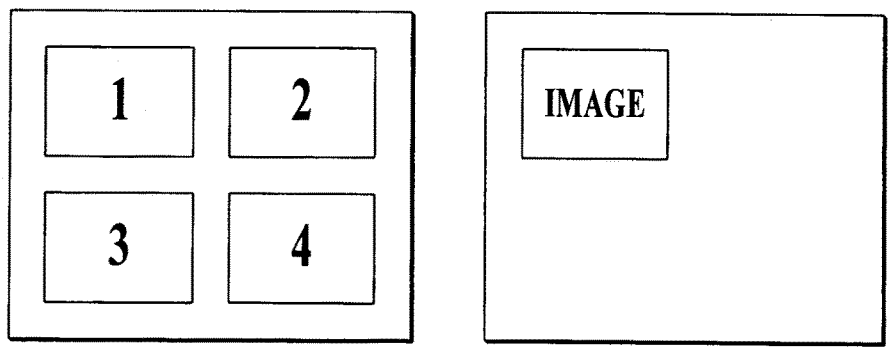

FIGS. 13B and 13C show modifications of output image patterns of output images for first two pages obtained when the handout mode is selected as the print mode. In the embodiment, only slides and note parts are disposed to be outputted. However, data outputted with slide data are not limited to note data. For example, as shown in FIG. 13B, themes (designs) respectively corresponding to the first to fourth slides may be disposed next to (after) the contents of their respective slides. Alternatively, as shown in FIG. 13C, a slide and media data such as an image (picture) called from the slide can be outputted independently of each other.

As described above, when making the printer engine 30 form slide images and note images with respect to the presentation file which has XML data files "slideY.xml" for slide images and XML data files "notesSlideX.xml" for note images associated with the slide images in an archive file, the information processing section 20 and the print control programs 24*a* and the printer driver 24*b* executed by the information processing section 20 can select target output images on which the image formation is performed from among the note images. Accordingly, when a note part (note image) includes no writing or includes writing which a user does not want to print, a necessary/desired note part can be easily selected to be printed. Furthermore, by printing only the selected note part, waste of paper can be eliminated.

In particular, by making selection of the print range of note parts of a presentation file in the OOXML format available, the above-described effects can be easily obtained when Power Point files are outputted.

Furthermore, whether or not to print each note part can be automatically judged by checking whether or not the data files "notesSlideX.xml", which are retrieved with the print control program 24*a* executed by the control section 21, include writing data of note parts. Accordingly, image formation of a note part with no writing therein can be easily omitted.

Furthermore, a note part which a user desires to output can be selected as a target output image by the user's operation of the operation section 28. Accordingly, when there is writing in a note part, but a user does not want to form an image of the note part, image formation of the note part can be easily omitted. Note that the present invention may be configured to optionally insert some space for memos, for example, in a part where something is expected to be handwritten later, even if there is currently no writing in a note part.

Furthermore, the print range of note parts and the print range of slides can be selected optionally and independently of each other. Also, all note parts and slides can be selected as target output images for image formation if a user desires. Accordingly, an image formation range can be more easily and conveniently selected. Furthermore, by not selecting slides as target output images at all, only note parts can be outputted.

Furthermore, by selecting and displaying not a note part but a theme, character information, media information (image/picture data) or the like of a slide with the slide, an image (picture) which is too small to see by printing as apart of a slide or a character/characters and an image (picture) which overlap with each other by animation can be separately displayed next to the slide so as to be easily seen.

Furthermore, the number of images of slides/note parts (output image number) formed on one sheet (page) and the order to dispose the images (output order) can be set. Accordingly, the output image number can be freely increased or decreased by taking into consideration the point if slides are easy to see. Furthermore, a setting for the increase/decrease of the output image number can be easily performed by an input from the operation section 28 via the print mode setting screen.

Furthermore, note parts, the images of which are conventionally formed only when the print mode is the note-format mode, can be outputted even when the handout mode or the slide mode is selected as the print mode. Accordingly, the usability of the handout mode and handouts can be increased in particular.

Furthermore, image formation is performed such that an image of a note part selected as a target output image is displayed next to its corresponding slide image. Accordingly, data corresponding to each other can be easily utilized.

In particular, when printing is performed in a set order, and accordingly a slide image and its corresponding note image (an image of a note part) are displayed on different sheets (pages), the position to print the slide image is moved to the next sheet (page), so that the slide image and the corresponding note image are displayed next to each other. Accordingly, while the usability of the data corresponding to each other is maintained, user's convenience can be increased.

The information processing apparatus, the image processing apparatus, the image forming apparatus and the storage medium of the present invention are not limited to the embodiment. For example, in the embodiment, the print data creation processing is performed based on a Power Point file in the OOXML format as a presentation file. However, this is not a limit. The presentation file in the OOXML format is not necessary to be created by Power Point, and may be created by other presentation software and stored in the OOXML format.

The presentation file in the ODF (Open Document Format) is not compatible with the OOXML format, but is an archive of a plurality of XML files in the ZIP format, and hence the same processing can be performed thereon by performing search/retrieval of the contents of note parts from files indicating the note parts.

Furthermore, in the embodiment, whether or not there is writing in a note part is judged on a note number basis (i.e. a slide basis) so that image formation is omitted thereon. However, it can be set that image formation is omitted on a paragraph basis. Furthermore, it can be set that image formation of a figure included in a note part is not performed.

In the embodiment, the image forming apparatus 1 creates print data in PDL based on the presentation file and the print setting information, and converts the print data into the intermediate data and the raster image data to perform image formation. However, it is possible that the print data is created in the computer 2. That is, it is possible that the computer 2 executes the print control programs 14*a* and the printer driver 14*b* stored in the computer 2 to create the print data, and transmits the print data to the image forming apparatus 1, and the image forming apparatus 1 converts the print data into the raster image data to perform image formation. In this case, it is preferable that the print data in PDL be created by the printer driver 14*b*, and the raster image data be created by the image forming apparatus 1. This is because, in general, image data has a quite larger size than print data.

Alternatively, it is possible that the computer 2 executes the print control program 14*a*, performs only the print setting via the operation section 18 and the display section 19, and transmits information on the print setting (print setting information) and the presentation file to the image forming apparatus 1, and the image forming apparatus 1 creates the print data.

In the embodiment, the print control programs 14*a* and 24*a* are described as programs independent of the presentation software, but may take a form in which the programs can be installed in the presentation software, such as a plug-in.

Furthermore, in the embodiment, as computer readable mediums to read the programs of the present invention, the ROMs 13 and 23 and the storage sections 14 and 24 are used. However this is not a limit.

Other than these, a nonvolatile memory such as a flash memory or a potable recording medium such as a CD-ROM can be used as the computer readable medium.

Furthermore, as a medium to provide data of the programs of the present invention via a communication line, a carrier wave can be used.

Furthermore, the specific configurations, the numeral values, the order of operations and the like can be appropriately modified without departing from the scope of the present invention.

This application is based upon and claims the benefit of priority under 35 USC 119 of Japanese Patent Application No. 2011-095786 filed on Apr. 22, 2011, the entire disclosure of which, including the description, claims, drawings, and abstract, is incorporated herein by reference in its entirety.

What is claimed is:

1. An information processing apparatus that creates data for image formation based on a file created by an application capable of selectively adding notes to pages comprising slides, the information processing apparatus comprising:
a controller that:
selects a first page that comprises a slide created by the application and a note corresponding to the slide and created by the application for the slide image-formed next to the slide;
with respect to the selected first page, secures a slide drawing area for the slide and a note drawing area for the note next to each other;
with respect to a second page that comprises a slide but not a note corresponding to the slide and that has a following page comprising a slide but not a note corresponding to the slide, secures a slide drawing area for the slide of the second page and a slide drawing area for the slide of the following page, which follows the second page, next to each other without securing a note drawing area; and
with respect to a third page that comprises a slide but not a note corresponding to the slide and that has a following page comprising a slide and a note corresponding to the slide, secures a slide drawing area for the slide of the third page and a blank area next to each other,
wherein a user independently selects each slide that will display a corresponding note area by inputting a specific slide number.

2. The information processing apparatus according to claim 1, further comprising an operation section that receives a specification of the first page from a user, wherein
the controller secures, with respect to the first page specified by the user, the slide drawing area for the slide and the note drawing area for the note next to each other.

3. The information processing apparatus according to claim 1, wherein the file is in an OOXML format.

4. The information processing apparatus according to claim 1, wherein the controller sets a number of the slides and/or the notes to be image-formed on one sheet, and sets a disposition of the slides and/or the notes of the set number on the sheet.

5. An image forming apparatus comprising:
the information processing apparatus according to claim 1; and
a printer engine that performs the image formation on the basis of the data for the image formation, the data being created by the information processing apparatus.

6. The information processing apparatus according to claim 1, wherein the user inputs that, of the slides to be in the image formation, a corresponding note is displayed for only slides in which the corresponding note has content.

7. A non-transitory computer readable storage medium storing a program that, when executed by an information processing apparatus, causes a controller of the information processing apparatus to create data for image formation based on a file created by an application capable of selectively adding notes to pages comprising slides, and further causes the controller to perform:
selecting a first page that comprises a slide created by the application and a note corresponding to the slide and created by the application for the slide image-formed next to the slide;
with respect to the selected first page, securing a slide drawing area for the slide and a note drawing area for the note next to each other;
with respect to a second page that comprises a slide but not a note corresponding to the slide and that has a following page comprising a slide but not a note corresponding to the slide, securing a slide drawing area for the slide of the second page and a slide drawing area for the slide of the following page, which follows the second page, next to each other without securing a note drawing area; and
with respect to a third page that comprises a slide but not a note corresponding to the slide and that has a following page comprising a slide and a note corresponding to the slide, securing a slide drawing area for the slide of the third page and a blank area next to each other,
wherein a user independently selects each slide that will display a corresponding note area by inputting a specific slide number.

8. The storage medium according to claim 7, wherein the program further causes:
an operation section of the information processing apparatus to perform receiving a specification of the first page from a user, and
the controller to perform securing, with respect to the first page specified by the user, the slide drawing area for the slide and the note drawing area for the note next to each other.

9. The storage medium according to claim 7, wherein the file is in an OOXML format.

10. The storage medium according to claim 7, wherein the program further causes the controller to perform setting a number of the slides and/or the notes to be image-formed on one sheet, and setting a disposition of the slides and/or the notes of the set number on the sheet.

11. The non-transitory computer readable storage medium according to claim 7, wherein the user inputs that, of the slides to be in the image formation, a corresponding note is displayed for only slides in which the corresponding note has content.

12. An information processing method for processing information performed by an information processing apparatus, the method comprising:

creating data for image formation based on a file created by an application capable of selectively adding notes to pages comprising slides;

selecting a first page comprising a slide created by the application and a note corresponding to the slide and created by the application for the slide image-formed next to the slide;

with respect to the selected first page, securing a slide drawing area for the slide and a note drawing area for the note corresponding to the slide next to each other;

with respect to a second page that comprises a slide but not a note corresponding to the slide and that has a following page comprising a slide but not a note corresponding to the slide, secures a slide drawing area for the slide of the second page and a slide drawing area for the slide of the following page, which follows the second page, next to each other without securing a note drawing area; and with respect to a third page that comprises a slide but not a note corresponding to the slide and that has a following page comprising a slide and a note corresponding to the slide, secures a slide drawing area for the slide of the third page and a blank area next to each other, wherein a user independently selects each slide that will display a corresponding note area by inputting a specific slide number.

13. The information processing method according to claim 12, wherein the user inputs that, of the slides to be in the image formation, a corresponding note is displayed for only slides in which the corresponding note has content.

* * * * *